(12) United States Patent
Zeng et al.

(10) Patent No.: US 12,443,733 B2
(45) Date of Patent: Oct. 14, 2025

(54) SAFETY ISOLATION METHOD AND APPARATUS, AND COMPUTER SYSTEM (71) Applicant: HUAWEI TECHNOLOGIES CO., LTD., Guangdong (CN)

(72) Inventors: Si Zeng, Shenzhen (CN); Hongyi Zeng, Shenzhen (CN); Jianbo Gao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 354 days.

(21) Appl. No.: 17/863,529

(22) Filed: Jul. 13, 2022

(65) Prior Publication Data
US 2022/0350915 A1 Nov. 3, 2022

Related U.S. Application Data (63) Continuation of application No. PCT/CN2020/071964, filed on Jan. 14, 2020.

(51) Int. Cl.
G06F 21/62 (2013.01)
G06F 12/14 (2006.01)

(52) U.S. Cl.
CPC ...... *G06F 21/6218* (2013.01); *G06F 12/1416* (2013.01); *G06F 2221/2113* (2013.01); *G06F 2221/2141* (2013.01)

(58) Field of Classification Search
CPC ............. G06F 21/6218; G06F 12/1416; G06F 2221/2113; G06F 2221/2141
(Continued)

(56) References Cited

U.S. PATENT DOCUMENTS 6,070,796 A * 6/2000 Sirbu ..................... G07C 9/257
235/382
9,836,318 B2 12/2017 Brewerton et al.
(Continued)

FOREIGN PATENT DOCUMENTS

CN 1759557 A 4/2006
CN 103679049 A 3/2014
(Continued)

OTHER PUBLICATIONS

Owda, Zaher, Moisés Urbina, Roman Obermaisser, and Mohammed Abuteir. "Hierarchical transactional memory Protocol for distributed mixed-criticality embedded systems." In 2016 IEEE 14th Intl Conf on Dependable, Autonomic and Secure Computing, pp. 334-343. IEEE, 2016. (Year: 2016).*
(Continued)

*Primary Examiner* — Luu T Pham
*Assistant Examiner* — Walter J Malinowski (57) ABSTRACT A safety isolation method and apparatus, and a computer system are disclosed. The safety isolation apparatus includes a request detection module and a selection module. The request detection module is configured to: receive an access request from an access device, where the access request carries operation information of the access device and safety level-related information of the access device, the safety level-related information of the access device indicates a safety level of the access device, and the operation information indicates an operation of the access device. The selection module is configured to: if the operation of the access device is a write operation or RFO operation, and the safety level of the access device meets a safety isolation condition, isolate the access request. The foregoing solution can implement safe data interaction between devices at a plurality of safety levels, to improve system performance.

11 Claims, 4 Drawing Sheets (58) Field of Classification Search
USPC .......................................................... 726/27
See application file for complete search history.

(56) References Cited

U.S. PATENT DOCUMENTS

| | | | | |
|---|---|---|---|---|
| 2007/0156971 | A1* | 7/2007 | Sistla | G06F 12/084 |
| | | | | 711/E12.028 |
| 2011/0277038 | A1* | 11/2011 | Sahita | G06F 21/6281 |
| | | | | 718/1 |
| 2016/0299949 | A1* | 10/2016 | Konik | G06F 16/24542 |
| 2017/0250989 | A1 | 8/2017 | Bhattacharya et al. | |
| 2018/0150251 | A1 | 5/2018 | Parker et al. | |
| 2018/0182052 | A1* | 6/2018 | Panagos | G06Q 10/10 |
| 2019/0220407 | A1* | 7/2019 | Duran Gonzalez | ........................ |
| | | | | G06F 12/0833 |
| 2019/0258251 | A1* | 8/2019 | Ditty | G05D 1/0274 |
| 2019/0268420 | A1* | 8/2019 | Acharya | H04L 63/166 |
| 2020/0116783 | A1* | 4/2020 | Kalva | G06F 13/1668 |
| 2020/0125501 | A1* | 4/2020 | Durham | G06F 12/0811 |

FOREIGN PATENT DOCUMENTS

| | | |
|---|---|---|
| CN | 107612939 A | 1/2018 |
| CN | 109606192 A | 4/2019 |
| CN | 110532781 A | 12/2019 |
| WO | 2019040229 A1 | 2/2019 |
| WO | WO-2021142612 A1 * | 7/2021 ......... G06F 12/1416 |

OTHER PUBLICATIONS

Xinfeng, Yang, and Liu Kecheng. "Analysis and comparison on new network security access technology—TNC and UAC." In Proceedings of 2011 International Conference on Computer Science and Network Technology, vol. 3, pp. 1736-1739. IEEE, 2011. (Year: 2011).*
Ruland, Christoph, and Jochen Sassmannshausen. "Access control in safety critical environments." In 2018 12th International Conference on Reliability, Maintainability, and Safety (ICRMS), pp. 223-229. IEEE, 2018. (Year: 2018).*
ISO 26262-1:2011, Road Vehicles, Functional Safety—Part 1: Vocabulary, Nov. 2011, 2 pages.
European Patent Office extended Search Report for application No. 20913793.4 dated Dec. 6, 2022, 9 pages.
PCT International Search Report for application No. PCT/CN2020/071964 dated Jan. 12, 2020, 9 pages.

* cited by examiner

SAFETY ISOLATION METHOD AND APPARATUS, AND COMPUTER SYSTEM

CROSS-REFERENCE TO RELATED APPLICATIONS

This application is a continuation of International Application No. PCT/CN2020/071964, filed on Jan. 14, 2020. The disclosures of the aforementioned applications are hereby incorporated by reference in their entireties.

TECHNICAL FIELD

This application relates to the field of autonomous driving technologies, and in particular, to a safety isolation method and apparatus, and a computer system.

BACKGROUND

With the increase in complexity of an automotive electronic system, to improve automotive safety, when a function safety design is performed on a system in the field of autonomous driving, hazard analysis and risk assessment need to be performed on the system in a design phase of an automobile product, to identify a hazard of the system and assess a risk level of the hazard. A higher risk indicates a corresponding higher safety level. Road vehicles-functional safety standard ISO 26262 introduces a concept of an automotive safety integrity level (ASIL), which is used to assess a safety level of an automobile, and defines four different ASILs: ASIL A, ASIL B, ASIL C, and ASIL D. ASIL A is the lowest safety level, and ASIL D is the highest safety level. In addition, if it is a quality management (QM) level, it is irrelevant to safety, and no corresponding safety requirement is required.

In a system including a plurality of different ASILs, devices corresponding to each ASIL are strictly limited in an isolation domain at a same ASIL safety level, and devices corresponding to different ASILs cannot interact with each other, so that a device corresponding to a high ASIL is not interfered with, so as to ensure system safety. However, the devices corresponding to the different ASILs also need to exchange a large amount of data. In the foregoing solution, the devices corresponding to the different ASILs cannot efficiently interact with each other, and overall performance of the system is affected. Consequently, an expected function cannot be implemented in a final automobile product.

SUMMARY

This application provides a safety isolation method and apparatus, and a computer system, to implement safe data interaction between devices at a plurality of safety levels, so as to improve system performance.

According to a first aspect, a safety isolation apparatus is provided, including a request detection module and a selection module. The request detection module is configured to: receive an access request from an access device, where the access request carries operation information of the access device and safety level-related information of the access device, the safety level-related information of the access device indicates a safety level of the access device, and the operation information indicates an operation of the access device. The selection module is configured to: if the operation of the access device is a write operation or a read for ownership (RFO) operation, and the safety level of the access device meets a safety isolation condition, isolate the access request.

Optionally, the apparatus may be applied to a computer system, for example, a system in an unattended driving system.

When the computer system is the system in an unattended driving system, driving of the unattended driving system can be controlled by the computer system.

It should be understood that in this application, a higher safety level indicates a higher safety degree.

The operation information of the access device may be an opcode of the access device.

According to this solution in this embodiment of this application, the access request is analyzed to prevent the access device that meets the isolation condition from rewriting to-be-accessed data, so that efficient data interaction between devices at different safety levels is implemented while a function safety requirement of the computer system is met, to improve system performance.

With reference to the first aspect, in some implementations of the first aspect, the selection module is further configured to: if the operation of the access device is a non-write operation and a non-RFO operation, or the safety level of the access device does not meet the safety isolation condition, allow the access request.

With reference to the first aspect, in some implementations of the first aspect, the access request further includes safety level-related information of to-be-accessed data. The safety level-related information of the to-be-accessed data indicates a safety level of the to-be-accessed data. The apparatus further includes a comparison module. The comparison module is configured to determine that the safety level of the access device meets the safety isolation condition. That the safety level of the access device meets the safety isolation condition includes: The safety level of the access device is lower than the safety level of the to-be-accessed data.

If an access device at a low safety level rewrites to-be-accessed data at a high safety level, when an access device at a high safety level uses the rewritten to-be-accessed data, a function safety requirement of the access device at the high safety level cannot be met, and consequently a system fault is caused. According to this solution in this embodiment of this application, the access device at the low safety level can be prevented from rewriting the to-be-accessed data at the high safety level, and a device at a low safety level is prevented from affecting a device at a high safety level, so that efficient data interaction between devices at different safety levels in the computer system is implemented, to improve system performance.

With reference to the first aspect, in some implementations of the first aspect, the safety level-related information of the to-be-accessed data includes an address of the to-be-accessed data. The comparison module is configured to: determine, based on the address of the to-be-accessed data, that the safety level of the access device is lower than the safety level of the to-be-accessed data.

According to this solution in this embodiment of this application, the safety level of the access device and the safety level of the to-be-accessed data can be compared based on the address, and implementation is easier and more convenient.

With reference to the first aspect, in some implementations of the first aspect, the comparison module is configured to: determine a first address based on a first mapping relationship, where the first address includes one or more addresses corresponding to data at a first safety level, the first safety level includes one or more safety levels higher than the safety level of the access device, and the first mapping relationship indicates a correspondence between a safety level of data and an address of the data; and if the address of the to-be-accessed data matches an address in the first address, determine that the safety level of the access device is lower than the safety level of the to-be-accessed data.

For example, the safety level of the access device is ASIL C, and the first safety level includes ASIL D. For another example, the safety level of the access device is ASIL B, and the first safety level includes ASIL C and ASIL D.

According to this solution in this embodiment of this application, the address of the to-be-accessed data can match the addresses corresponding to the plurality of safety levels, so that a processing speed is increased, and efficient data interaction is further ensured.

With reference to the first aspect, in some implementations of the first aspect, the comparison module is further configured to obtain the first mapping relationship from a register group.

A plurality of isolation domains in the computer system may be determined based on a plurality of groups of register information. The plurality of isolation domains are used to isolate the devices and data at different safety levels. The register information includes an address domain attribute of a safety level corresponding to an isolation domain. The first mapping relationship may include address domain attributes of safety levels corresponding to the plurality of isolation domains. The address domain attribute of the safety level corresponding to the isolation domain may include the safety level corresponding to the isolation domain, a base address of the isolation domain, and a space size of the isolation domain. Addresses in an address domain at each safety level may be consecutive addresses, or may be multiple inconsecutive addresses.

According to this solution in this embodiment of this application, the first mapping relationship is obtained by a register, so that storage space can be reduced, and implementation is easier and more convenient.

With reference to the first aspect, in some implementations of the first aspect, the selection module is further configured to: if the operation of the access device is the write operation or the RFO operation, and the safety level of the access device meets the safety isolation condition, report a safety interruption.

According to this solution in this embodiment of this application, the safety interruption is reported to notify software that a safety fault occurs. This can ensure that the safety fault is visible to the software, and the system does not stop responding.

With reference to the first aspect, in some implementations of the first aspect, the request detection module is further configured to: determine whether check information is the same as content of the access request; and if the check information is the same as the content of the access request, the operation of the access device is the write operation or the RFO operation, and the safety level of the access device meets the safety isolation condition, isolate the access request. The check information is obtained by copying the content of the access request.

According to this solution in this embodiment of this application, the access request is checked, so that the access request having a fault can be isolated, thereby ensuring reliability of data interaction.

With reference to the first aspect, in some implementations of the first aspect, the request detection module is further configured to: determine whether the safety level of the access device is lower than or equal to a preset safety level; and if the safety level of the access device is lower than or equal to the preset safety level, the operation of the access device is the write operation or the RFO operation, and the safety level of the access device meets the safety isolation condition, isolate the access request.

According to this solution in this embodiment of this application, a subsequent step can be skipped if the safety level of the access device is higher than the preset safety level. For example, the access request is directly allowed, so that a processing speed is increased, and efficient data interaction is further ensured.

According to a second aspect, a computer system is provided, including a safety isolation apparatus and an access device. The access device is configured to send an access request. The access request carries operation information of the access device and safety level-related information of the access device. The safety level-related information of the access device indicates a safety level of the access device. The operation information indicates an operation of the access device. The safety isolation apparatus is configured to: receive the access request, and if the operation of the access device is a write operation or an RFO operation, and the safety level of the access device meets a safety isolation condition, isolate the access request.

With reference to the second aspect, in some implementations of the second aspect, the safety isolation apparatus is further configured to: if the operation of the access device is a non-write operation and a non-RFO operation, or the safety level of the access device does not meet the safety isolation condition, allow the access request.

With reference to the second aspect, in some implementations of the second aspect, the access request further includes safety level-related information of to-be-accessed data. The safety level-related information of the to-be-accessed data indicates a safety level of the to-be-accessed data. That the safety level of the access device meets the safety isolation condition includes: The safety level of the access device is lower than the safety level of the to-be-accessed data. According to a third aspect, a safety isolation method is provided, including: receiving an access request from an access device, where the access request carries operation information of the access device and safety level-related information of the access device, the safety level-related information of the access device indicates a safety level of the access device, and the operation information indicates an operation of the access device; and if the operation of the access device is a write operation or a read for ownership RFO operation, and the safety level of the access device meets a safety isolation condition, isolating the access request.

According to this solution in this embodiment of this application, the access request is analyzed to prevent the access device that meets the isolation condition from rewriting to-be-accessed data, so that efficient data interaction between devices at different safety levels in a computer system is implemented while a function safety requirement of the computer system is met, to improve system performance.

With reference to the third aspect, in some implementations of the third aspect, the method further includes: if the operation of the access device is a non-write operation and a non-RFO operation, or the safety level of the access device does not meet the safety isolation condition, allowing the access request.

With reference to the third aspect, in some implementations of the third aspect, the access request further includes safety level-related information of the to-be-accessed data. The safety level-related information of the to-be-accessed data indicates a safety level of the to-be-accessed data. That the safety level of the access device meets the safety isolation condition includes: The safety level of the access device is lower than the safety level of the to-be-accessed data.

If an access device at a low safety level rewrites to-be-accessed data at a high safety level, when an access device at a high safety level uses the rewritten to-be-accessed data, a function safety requirement of the access device at the high safety level cannot be met, and consequently a system fault is caused. According to this solution in this embodiment of this application, the access device at the low safety level can be prevented from rewriting the to-be-accessed data at the high safety level, and a device at a low safety level is prevented from affecting a device at a high safety level, so that efficient data interaction between devices at different safety levels in the computer system is implemented, to improve system performance.

With reference to the third aspect, in some implementations of the third aspect, the safety level-related information of the to-be-accessed data includes an address of the to-be-accessed data. The safety level of the access device is lower than the safety level of the to-be-accessed data. The method includes: determining, based on the address of the to-be-accessed data, that the safety level of the access device is lower than the safety level of the to-be-accessed data.

According to this solution in this embodiment of this application, the safety level of the access device and the safety level of the to-be-accessed data can be compared based on the address, and implementation is easier and more convenient.

With reference to the third aspect, in some implementations of the third aspect, the determining, based on the address of the to-be-accessed data, that the safety level of the access device is lower than the safety level of the to-be-accessed data includes: determining a first address based on a first mapping relationship, where the first address includes one or more addresses corresponding to data at a first safety level, the first safety level includes one or more safety levels higher than the safety level of the access device, and the first mapping relationship indicates a correspondence between a safety level of data and an address of the data; and if the address of the to-be-accessed data matches an address in the first address, determining that the safety level of the access device is lower than the safety level of the to-be-accessed data.

According to this solution in this embodiment of this application, the address of the to-be-accessed data can match the addresses corresponding to the plurality of safety levels, so that a processing speed is increased, and efficient data interaction is further ensured.

With reference to the third aspect, in some implementations of the third aspect, the method further includes: obtaining the first mapping relationship from a register group.

According to this solution in this embodiment of this application, the first mapping relationship is obtained by a register, so that storage space can be reduced, and implementation is easier and more convenient.

With reference to the third aspect, in some implementations of the third aspect, the foregoing method further includes: if the operation of the access device is the write operation or the RFO operation, and the safety level of the access device meets the safety isolation condition, reporting a safety interruption.

According to this solution in this embodiment of this application, the safety interruption is reported to notify software that a safety fault occurs. This can ensure that the safety fault is visible to the software, and the system does not stop responding.

With reference to the third aspect, in some implementations of the third aspect, the foregoing method further includes: determining whether check information is the same as content of the access request; and if the check information is the same as the content of the access request, the operation of the access device is the write operation or the RFO operation, and the safety level of the access device meets the safety isolation condition, isolating the access request. The check information is obtained by copying the content of the access request.

According to this solution in this embodiment of this application, the access request is checked, so that the access request having a fault can be isolated, thereby ensuring reliability of data interaction.

With reference to the third aspect, in some implementations of the third aspect, the method further includes: determining whether the safety level of the access device is lower than or equal to a preset safety level; and if the safety level of the access device is lower than or equal to the preset safety level, the operation of the access device is the write operation or the RFO operation, and the safety level of the access device meets the safety isolation condition, isolating the access request.

According to this solution in this embodiment of this application, a subsequent step can be skipped if the safety level of the access device is higher than the preset safety level. For example, the access request is directly allowed, so that a processing speed is increased, and efficient data interaction is further ensured.

DESCRIPTION OF EMBODIMENTS

The following describes technical solutions of this application with reference to the accompanying drawings.

A computer system in embodiments of this application may be applied to an autonomous driving system.

Figure 1:
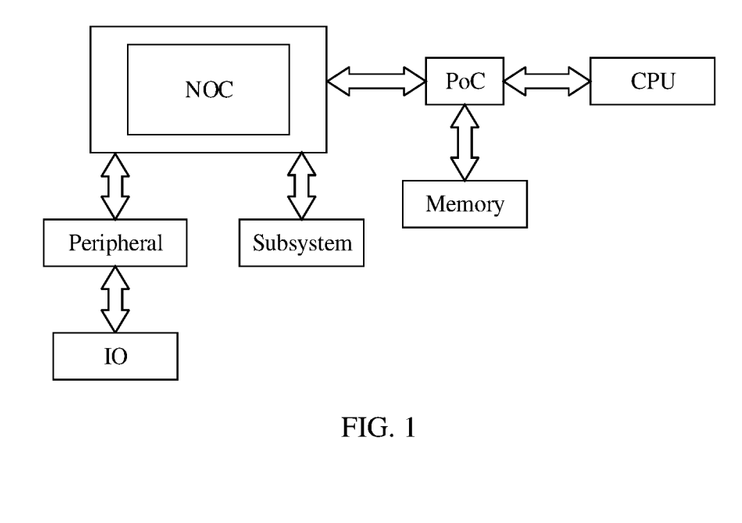
FIG. 1 is a schematic block diagram of a computer system according to an embodiment of this application.

FIG. 1 is a schematic diagram of a computer system according to an embodiment of this application.

The computer system includes a plurality of devices at different safety levels. The computer system shown in FIG. 1 includes a central processing unit (CPU). The central processing unit may be coupled to a bus. The bus may be an on-chip bus, for example, a network on chip (NOC). There may be one or more central processing units. Each processing unit may include one or more processing unit cores. A point of coherence (PoC) exists behind the CPU. The PoC is configured to ensure high-speed cache coherence. All CPUs in the system may observe consistent information.

The on-chip bus may be coupled to a memory, a subsystem, and a peripheral.

The memory may include instructions (for example, program logic). The instructions may be executed by the processing unit to perform various functions of a vehicle.

For example, in addition to the instructions, the memory may also store data, such as road maps, route information, locations, directions, and speeds of the vehicle and other such vehicle data, as well as other information. Such information may be used by the vehicle and the computer system when the vehicle operates in an autonomous mode, a semi-autonomous mode, and/or a manual mode.

In this embodiment of this application, a function of the vehicle may be controlled based on inputs received from various subsystems and the peripheral. The subsystem may include one or more devices.

The vehicle may interact with an external sensor, another vehicle, another computer system, or a user by using the peripheral. The peripheral may include a wireless communications system, a vehicle-mounted computer, a microphone, and/or a speaker.

In some embodiments, the peripheral may provide a means for the vehicle to interact with a user interface. For example, the vehicle-mounted computer may provide information for a user of a vehicle. In another case, the peripheral may provide a means for the vehicle to communicate with another device in the vehicle. For example, the microphone may receive audio (for example, a voice command or another audio input) from a user of a vehicle. Similarly, the speaker may output audio to the user of the vehicle.

The wireless communications system may wirelessly communicate with one or more devices directly or through a communications network. For example, the wireless communications system may use 3G cellular communications such as code division multiple access (CDMA), Evolution-Data Optimized (EVDO), a global system for mobile communications (GSM)/a general packet radio service (GPRS), 4G cellular communications such as long term evolution (LTE), or 5G cellular communications. The wireless communications system may communicate with a wireless local area network (WLAN) by using wireless Internet access (Wi-Fi).

In some embodiments, the wireless communications system may directly communicate with a device by using an infrared link, Bluetooth, or ZigBee protocol. Other wireless protocols, such as various vehicle communications systems, for example, the wireless communications system, may include one or more dedicated short range communications (DSRC) devices which may include public and/or private data communications between vehicles and/or roadside stations.

Optionally, an input/output (I/O) interface may include one or more input/output devices in a set of peripherals, for example, a wireless communications system, a vehicle-mounted computer, a microphone, and a speaker.

Optionally, the foregoing components are merely examples. During actual application, components in the foregoing modules may be added or removed based on an actual requirement. FIG. 1 should not be construed as a limitation on this embodiment of this application.

When the computer system is located in the autonomous driving system, isolation (partitioning) of devices at different safety levels and data at different safety levels in the computer system is substantively isolation of devices at different safety levels in the autonomous driving system. The safety level may include QM, ASIL A, ASIL B, ASIL C, and ASIL D.

If the autonomous driving system includes devices at a plurality of ASIL safety levels, in terms of a function safety policy, a device at ASIL D needs to ensure that 99% of faults can be detected and processed, and a device at ASIL B needs to ensure that only 90% of faults can be detected and processed. After data at an address is rewritten by a device at a low ASIL safety level, in a rewriting process, the data at the address is processed based on a function safety requirement of a low safety level. When a device at a high ASIL safety level uses data rewritten by a device at a low safety level, the device at the high ASIL safety level has a higher fault probability, and cannot meet a requirement on a fault detection rate of the device at the high ASIL safety level.

For example, for a vehicle-mounted chip system having a display device, a safety level of a display chip related to the display device may be ASIL B, and a safety level of a control chip related to a control device may be ASIL D. The display device has a higher fault tolerance capability when processing data. If a fault occasionally occurs in the data, only a pixel in a displayed image is incorrect, and the overall viewing experience is not affected much. When the control device processes data, if a fault occurs in instruction data, a control function may be disordered, and even a system crash may occur. In the vehicle-mounted chip system, if instruction storage space in the control chip is rewritten by the display chip, in a rewriting process, the instruction storage space processes data based on the ASIL B safety level, that is, a fault detection rate of the data in the storage space is only 90%. If the control chip uses the storage space, the control chip has a higher fault probability, and cannot meet a requirement on a 99% fault detection rate corresponding to the ASIL D safety level of the control chip.

Therefore, to implement safe driving, isolation between devices at different safety levels needs to be implemented, efficient data interaction is ensured, and a device at a high safety level is not affected by a device at a low safety level, to improve overall system performance.

Figure 2:
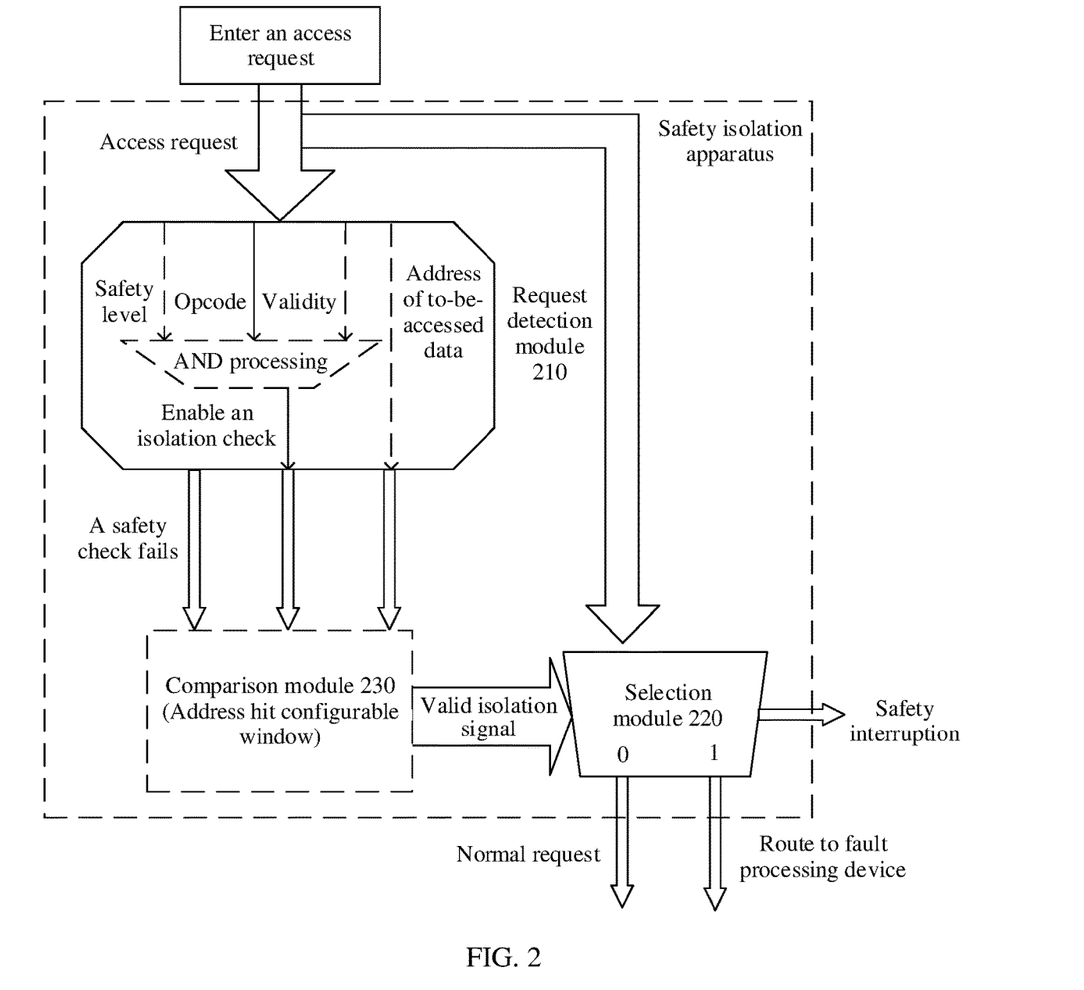
FIG. 2 is a schematic block diagram of a safety isolation apparatus according to an embodiment of this application.
Figure 3A:
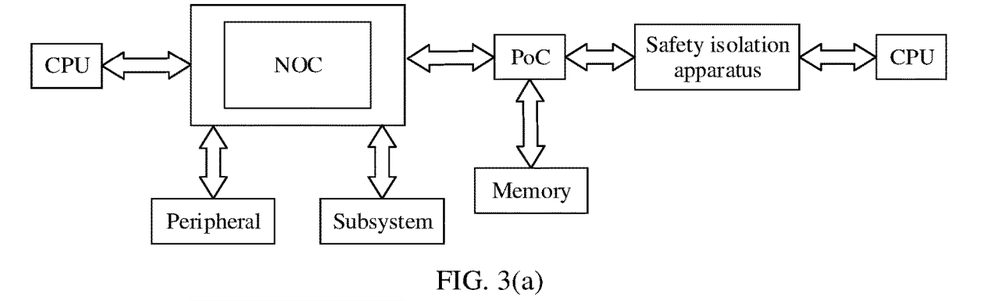
FIG. 3(a), FIG. 3(b), and FIG. 3(c) are schematic block diagrams of another computer system according to an embodiment of this application.
Figure 3B:
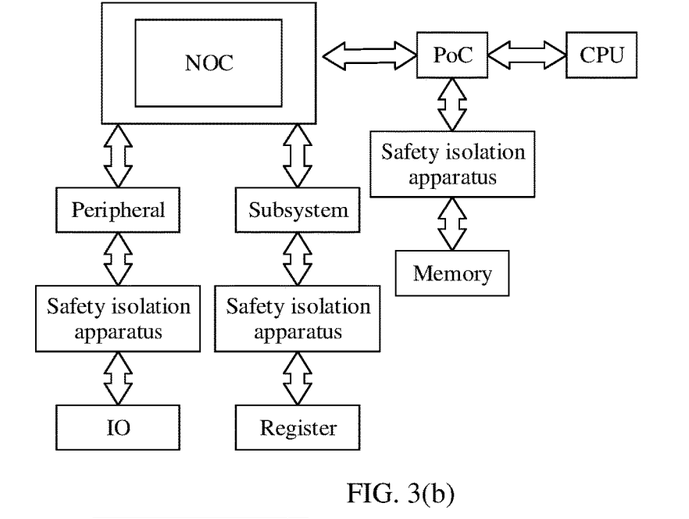
Figure 3C:
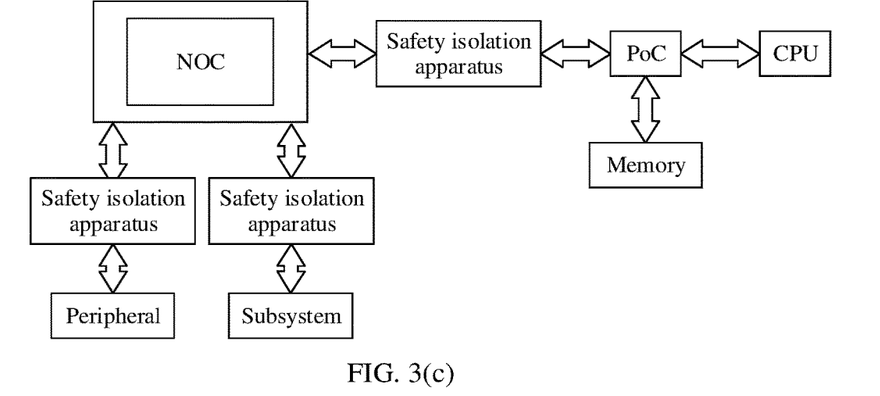
Figure 4:
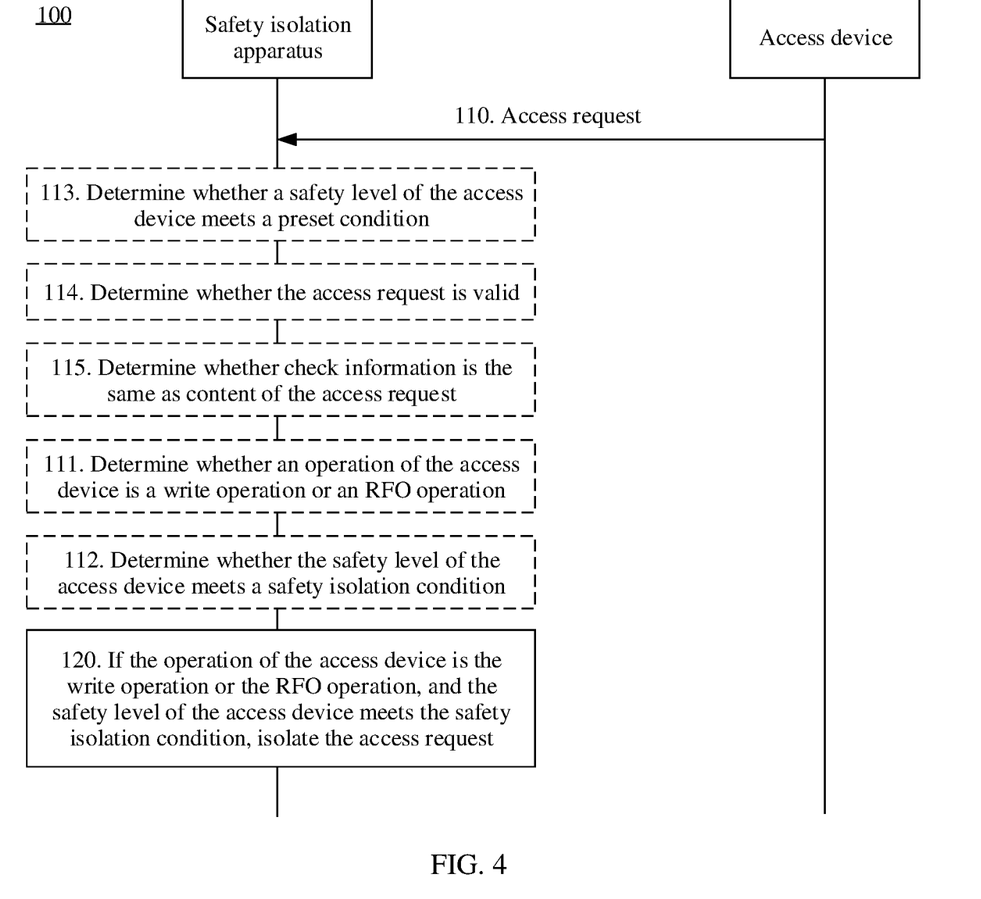
FIG. 4 is a schematic flowchart of a safety isolation method according to an embodiment of this application.

The following describes in detail a safety isolation method in embodiments of this application with reference to FIG. 2 to FIG. 4.

FIG. 2 is a schematic block diagram of a safety isolation apparatus according to an embodiment of this application. Optionally, the safety isolation apparatus may be applied to a computer system. The computer system includes a plurality of devices at different safety levels, for example, a device in FIG. 1. The computer system may be a vehicle-mounted electronic system. The safety level may be a safety level of the vehicle-mounted electronic system. The safety level may include QM, ASIL A, ASIL B, ASIL C, and ASIL D.

A plurality of isolation domains may be set on the computer system. Each isolation domain corresponds to a safety level. The plurality of isolation domains are used to implement safety isolation of the devices and data at different safety levels. The plurality of isolation domains may be configured based on a function safety requirement of a system. The isolation domain may be set for all devices in the computer system and all data, to implement safety isolation between devices at different safety levels, and/or implement safety isolation between data and devices at different safety levels. Alternatively, the isolation domain may also be set only for some devices, to implement isolation between a device in the isolation domain and a device outside the isolation domain. For example, an isolation domain is set for a device corresponding to ASIL D and a device corresponding to ASIL C, and no isolation domain is set for a device at another safety level. Alternatively, the isolation domain may also be set only for some data, to implement isolation between data in the isolation domain and a device outside the isolation domain.

The safety isolation apparatus includes a request detection module 210 and a selection module 220.

The request detection module 210 receives an access request from an access device.

The access request carries operation information of the access device and safety level-related information of the access device. For example, the access request transfers, in a payload, the operation information of the access device and the safety level-related information of the access device.

The safety level-related information of the access device indicates a safety level of the access device. The operation information indicates an operation of the access device. For example, the operation information may be an opcode.

For example, the request detection module 210 may decode the access request, to obtain the operation information of the access device and the safety level-related information of the access device. In this case, the request detection module 210 may also be referred to as a request decoder (RD) module.

Alternatively, the access request received by the request detection module 210 may be a decoded access request.

The selection module 220 isolates the access request if the operation of the access device is a write operation or a read for ownership (RFO) operation, and the safety level of the access device meets a safety isolation condition.

Specifically, the selection module 220 may be configured to route the access request. For example, the selection module 220 may be a multiplexer (MUX). The MUX can be configured to route the access request.

Isolating the access request means that the access device is not allowed to access to-be-accessed data. For example, the selection module 220 may not route the access request to the to-be-accessed data. The computer system may further include a default slave device. For example, the default slave device may be a fault processing device. The selection module 220 may route the access request to the default slave device.

Specifically, that the safety level of the access device meets the safety isolation condition includes: The safety level of the access device is lower than a second safety level. The second safety level may be a fixed value or may be a variable value. The second safety level may be related to a safety level of to-be-accessed data. For example, the second safety level may be a safety level of the to-be-accessed data.

Optionally, the access request further includes safety level-related information of the to-be-accessed data. The safety level-related information of the to-be-accessed data indicates a safety level of an accessed device. That the safety level of the access device meets the safety isolation condition includes: The safety level of the access device is lower than the safety level of the to-be-accessed data.

In this embodiment of this application, a higher safety level indicates a higher safety degree.

If an operation of an access device A is an RFO operation, the access device A may read to-be-accessed data and obtain an exclusive permission for the to-be-accessed data. An address of the to-be-accessed data is an address A. The access device A may modify data in a cache corresponding to the address A. If the access device A obtains the exclusive permission for the to-be-accessed data, when an access device B needs to read the data corresponding to the address A, the access device B initiates monitoring to obtain the data in the cache of the access device A. That is, the data obtained by the access device B is the data modified by the accessed device A. If the safety level of the access device A is lower than the safety level of the to-be-accessed data, the data obtained by the access device B is data rewritten by a device at a low safety level. If the safety level of the access device B is the same as the safety level of the to-be-accessed data, a function safety requirement of the access device B cannot be met. For example, a fault detection rate of the access device B cannot be ensured, and consequently a system fault is caused.

If the operation of the access device A is a non-RFO operation, the access device B may read the to-be-accessed data, and may not obtain the data in the cache of the access device A. In this way, the access device A cannot affect another access device by modifying content in the cache of the access device A.

Therefore, a request for the RFO operation of the access device whose safety level meets the safety isolation condition is isolated, so that a case in which system function safety cannot be met because data at a high safety level is modified can be avoided.

Optionally, the selection module 220 may further allow the access request if the operation of the access device is a non-write operation and a non-RFO operation, or the safety level of the access device does not meet the safety isolation condition.

Allowing the access request means that the access device is allowed to access the to-be-accessed data. For example, the selection module 220 may route the access request to the to-be-accessed data.

That is, if the operation of the access device is the non-write operation and the non-RFO operation, for example, if the operation of the access device is a non-RFO read operation, the selection module 220 may route the access request to the to-be-accessed data.

Alternatively, if the safety level of the access device does not meet the safety isolation condition, for example, if the safety level of the access device is higher than or equal to the safety level of the to-be-accessed data, the selection module 220 may route the access request to the to-be-accessed data.

In this way, an access request that does not meet the safety isolation condition may be permitted, and an access request for the non-RFO read operation may be permitted. For example, the access device is allowed to perform the write operation or the RFO operation on data at a same safety level or a low safety level, and the access device is allowed to perform the non-RFO read operation on the to-be-accessed data.

Further, the computer system may further include a function safety module, for example, a function safety CPU. The selection module 220 may further report a safety interruption to the function safety module, to notify software that a safety fault has occurred. This can ensure that the system does not stop responding, and the safety fault is visible to the software. Therefore, function safety integrity is ensured.

Optionally, the safety isolation apparatus may further include a comparison module 230. The comparison module 230 may be configured to determine whether the safety level of the access device is lower than the safety level of the to-be-accessed data. If the safety level of the access device is lower than the safety level of the to-be-accessed data, the comparison module 230 may output a valid isolation signal to the selection module 220.

Specifically, being triggered by the valid isolation signal, for example, an output level of the valid isolation signal is a high level, the selection module 220 may isolate the access request. In FIG. 2, "0" may be understood as a low level, and "1" may be understood as a high level. If the valid isolation signal is not received, for example, an output level of the valid isolation signal is a low level, the selection module 220 may allow the access request.

The comparison module 230 may, triggered by an enable signal, determine whether the safety level of the access device is lower than the safety level of the to-be-accessed data.

The enable signal may be sent by the request detection module 210 to the comparison module 230.

Optionally, the safety level-related information of the to-be-accessed data includes an address of the to-be-accessed data. The comparison module 230 may, based on the address of the to-be-accessed data, determine whether the safety level of the access device is lower than the safety level of the to-be-accessed data. The comparison module 230 may also be referred to as an address comparison (AC) module.

If the request detection module may be configured to decode the access request, the address of the to-be-accessed data may be obtained by the request detection module. As shown in FIG. 2, the request detection module may transmit the address of the to-be-accessed data to the comparison module. It should be understood that the address of the to-be-accessed data may also be decoded by another device in the computer system and then transmitted to the comparison module.

For example, the comparison module 230 may determine the safety level of the to-be-accessed data based on a first mapping relationship, and then determine whether the safety level of the access device is lower than the safety level of the to-be-accessed data. The first mapping relationship indicates a correspondence between an address of data and a safety level of the data.

The first mapping relationship may be stored in the safety isolation apparatus, or may be stored in a register in the computer system.

Optionally, the comparison module 230 may obtain the first mapping relationship from the register.

A plurality of isolation domains in the computer system may be determined based on a plurality of groups of register information. The register information includes an address domain attribute of a safety level corresponding to an isolation domain. The first mapping relationship may include address domain attributes of safety levels corresponding to the plurality of isolation domains. The address domain attribute of the safety level corresponding to one isolation domain may include the safety level corresponding to the isolation domain, a base address of the isolation domain, and a space size of the isolation domain. Addresses in an address domain corresponding to each safety level may be consecutive addresses, or may be multiple inconsecutive addresses.

It should be understood that content of the register information may be set by a user, and specific content of the register information is not limited in this embodiment of this application.

Optionally, the comparison module 230 may determine whether the safety level of the access device is lower than the safety level of the to-be-accessed data by performing the following steps.

(1) A first address is determined based on the first mapping relationship. The first address includes one or more addresses corresponding to data at a first safety level. The first safety level includes one or more safety levels higher than the safety level of the access device.

For example, the safety level of the access device is ASIL C, and the first safety level includes ASIL D. For another example, the safety level of the access device is ASIL B, and the first safety level includes ASIL C and ASIL D.

Specifically, the comparison module 230 may obtain, from the register, a base address of an isolation domain corresponding to the first safety level and a space size of the isolation domain corresponding to the first safety level.

The first safety level may be determined by the comparison module 230. Alternatively, the first safety level may also be obtained by the request detection module 210. Specifically, the request detection module processes the access request, determines a safety level higher than the safety level of the access device as the first safety level, and transmits the first safety level to the AC module.

(2) If the address of the to-be-accessed data matches an address in the first address, it is determined that the safety level of the access device is lower than the safety level of the to-be-accessed data. The address of the to-be-accessed data matching the address in the first address may also be referred to as that the address of the to-be-accessed data hits the address in the first address.

Address regions at different safety levels are configured by using a register group, and a manner such as a page table is not required, so that the system can be simplified.

Optionally, the request detection module 210 may be configured to determine whether the operation of the access device is the write operation or the RFO operation. For example, the request detection module 210 in FIG. 2 may determine the "opcode".

If the operation of the access device is the write operation or the RFO operation, the request detection module may output an enable signal to the comparison module 230, to enable the comparison module 230.

Optionally, the request detection module 210 may be further configured to determine whether the safety level of the access device meets a preset condition. If the safety level of the access device meets the preset condition, and the operation of the access device is the write operation or the RFO operation, an enable signal may be sent to the comparison module 230, to enable the comparison module 230. For example, determining the "safety level" in FIG. 2 is determining whether the safety level of the access device meets the preset condition.

For example, the preset condition may be that the safety level is lower than a preset safety level. For example, a preset safety level may include ASIL D. If the operation of the access device is the write operation, and the safety level of the access device is lower than ASIL D, the request detection module may output an enable signal to the comparison module. For another example, a preset safety level may include ASIL D. If the operation of the access device is the RFO operation, and the safety level of the access device is lower than ASIL D, the request detection module may output an enable signal to the comparison module.

Optionally, the request detection module 210 may be further configured to determine whether the access request is valid. As shown in FIG. 2, determining "validity" is determining whether the access request is valid. If the access request is valid, and the operation of the access device is the write operation or the RFO operation, an enable signal may be sent to the comparison module 230. When the request detection module 210 is further configured to determine whether the safety level of the access device meets the preset condition, if the safety level of the access device meets the preset condition, the operation of the access device is the write operation or the RFO operation, and the access request is valid, the request detection module 210 may send an enable signal to the comparison module 230. The enable signal is an isolation check enable signal in FIG. 2. The isolation check enable signal being at a high level may be understood that a safety check in the request detection module fails, and the comparison module 230 needs to perform a further safety check.

If the access request is invalid, the comparison module 230 may send a signal to the selection module 220, and the selection module 220 isolates the access request. Alternatively, if the access request is invalid, the request detection module 210 may send a signal to the selection module 220, and the selection module 220 isolates the access request.

Optionally, the request detection module 210 may be further configured to determine whether check information is the same as content of the access request. The check information is obtained by copying the content of the access request. For example, the check information is obtained by copying the operation information of the access device, the safety level-related information of the to-be-accessed data, and the safety level-related information of the access device that are carried in the access request.

If the check information is different from the content of the access request, the request detection module 210 may send a signal to the selection module 220, and the selection module 220 isolates the access request. Alternatively, the request detection module 210 may send a signal to the selection module 220 by using the comparison module 230, and the selection module 220 isolates the access request.

In an implementation, the RD module may parse information carried in the access request, to identify whether information other than address information meets an isolation requirement. For example, "AND processing" in FIG. 2 determines whether a safety level, an opcode, and validity meet an isolation requirement. The AC module may be configured to compare the address information, that is, compare the safety levels of the access devices. In this way, a plurality of addresses may be compared at the same time, that is, the address of the to-be-accessed data is compared with a plurality of addresses stored in the register at the same time. For example, in the comparison module, the addresses may be compared in an address hit configurable window, and different address hit configurable windows may be set for different safety levels. In this way, the addresses of the to-be-accessed data may be compared in a plurality of windows at the same time. This can improve efficiency.

If an access device at a low safety level rewrites to-be-accessed data at a high safety level, when an access device at a high safety level uses the rewritten to-be-accessed data, a function safety requirement of the access device at the high safety level cannot be met, and consequently a system fault is caused. In this embodiment of this application, devices and data in the computer system are classified based on the safety levels, so that the devices and data at different safety levels can be isolated. The access request is analyzed to prevent the access device that meets the isolation condition from rewriting the to-be-accessed data, so that efficient data interaction between the devices at different safety levels in the computer system is implemented while the function safety requirement of the computer system is met, to improve system performance. For example, an access device at a low safety level is prevented from rewriting to-be-accessed data at a high safety level, and a device at a low safety level is prevented from affecting a device at a high safety level.

FIG. 3(*a*), FIG. 3(*b*), and FIG. 3(*c*) are schematic block diagrams of a structure of a computer system according to an embodiment of this application. The computer system includes a safety isolation apparatus and an access device. The access device may be a device in FIG. 1.

When the access device initiates an access request, the access request is transmitted through an address bus along with a hardware signal. When the hardware signal passes through the safety isolation apparatus, the safety isolation apparatus performs a safety check on the hardware signal.

A location of the safety isolation apparatus may be allocated based on a function safety requirement of the computer system.

In a possible implementation, the safety isolation apparatus may be directly connected to the access device, that is, the safety isolation apparatus may be located at a source end of the access request. In this case, after the access request is sent, safety isolation may be directly performed.

As shown in FIG. 3(*a*), access devices are CPUs, and the safety isolation apparatus may be connected to the CPUs. The CPUs indicate a plurality of CPU cores. Because isolation is implemented based on an address, if a safety request that passes through the safety isolation apparatus arrives at a PoC, the PoC may perform coherence maintenance on the isolated access request based on the address. For example, safety isolation is completed after the last level of cache of the CPU. This implements coherence maintenance of caches at different safety levels, and ensures that data cached in the caches meets system function safety, that is, for an address in a memory, stored data meets the system function safety.

In a possible implementation, the safety isolation apparatus may be directly connected to an accessed device, that is, the safety isolation apparatus may be located at a destination end of the access request. To-be-accessed data is stored in the accessed device. In this case, safety isolation is performed before the access request reaches the accessed device. In this way, when there are a large number of access devices and a small number of accessed devices in the computer system, a quantity of safety isolation apparatuses can be reduced. It should be understood that the accessed device may store to-be-accessed data at one safety level, or may store to-be-accessed data at a plurality of safety levels.

Specifically, the safety isolation apparatus may be connected to an accessed device that has a safety isolation requirement. Alternatively, it may be understood that the safety isolation apparatus may be connected to an accessed device that stores data at a high safety level.

For example, the access device may include a plurality of CPUs, and the accessed device may include a memory, an IO device, and a register. If data stored in the memory, the IO, and the register belongs to ASIL D, a safety isolation apparatus may be disposed at an input end of a device that stores data corresponding to ASIL D.

As shown in FIG. 3(*b*), a memory, an IO device, and a register are at ASIL D, and safety isolation apparatuses may be disposed at input ends of the three devices.

In a possible implementation, the safety isolation apparatus may be located between a source end and a destination end of the access request, that is, the safety isolation apparatus may not be connected to an accessed device or the access device.

Optionally, the access device may be connected to a bus by using the safety isolation apparatus.

As shown in FIG. 3(*c*), a bus of the computer system may be a ring bus, and the safety isolation apparatus may be connected to the ring bus. This can ensure that all access requests meet function safety before entering the bus. During data interaction in the entire system, only the access request that meets the function safety can be used for data interaction. The access request that does not meet the function safety can be used for data interaction only in a subsystem. When the computer system includes a plurality of subsystems, a design difficulty of the subsystem can be reduced. For example, interfaces of subsystems are uniformly designed to reduce a design difficulty.

The following describes a safety isolation method in embodiments of this application with reference to FIG. 4. The safety isolation method shown in FIG. 4 may be performed by a safety isolation apparatus in FIG. 2, FIG. 3(*a*), FIG. 3(*b*), or FIG. 3(*c*). When the following describes the safety isolation method in embodiments of this application, repeated descriptions are properly omitted.

The safety isolation method shown in FIG. 4 may be applied to a computer system. The computer system includes a plurality of devices at different safety levels and a safety isolation apparatus. The computer system may be a vehicle-mounted electronic system. The safety level may be a safety level of the vehicle-mounted electronic system. The safety level may include QM, ASIL A, ASIL B, ASIL C, and ASIL D.

The method 100 shown in FIG. 4 includes step 110 to step 120. The following describes step 110 to step 120 in detail.

110. An access device sends an access request, and a safety isolation apparatus receives the access request from the access device.

The access request carries operation information of the access device and safety level-related information of the access device.

The safety level-related information of the access device indicates a safety level of the access device. The operation information indicates an operation of the access device. For example, the operation information may be an opcode.

The safety isolation apparatus may decode the access request, to obtain the operation information of the access device and the safety level-related information of the access device.

Alternatively, the access request received by the safety isolation apparatus may be a decoded access request.

Optionally, the method 100 may further include step 111.

111. The safety isolation apparatus determines whether an operation of the access device is a write operation or an RFO operation.

Optionally, the method 100 may further include step 112.

112. The safety isolation apparatus determines whether the safety level of the access device meets a safety isolation condition.

Specifically, that the safety level of the access device meets the safety isolation condition includes: The safety level of the access device is lower than a second safety level. The second safety level may be a fixed value or may be a variable value. The second safety level may be related to a safety level of to-be-accessed data. For example, the second safety level may be a safety level of the to-be-accessed data.

Optionally, the access request further includes safety level-related information of the to-be-accessed data. The safety level-related information of the to-be-accessed data indicates a safety level of an accessed device. That the safety level of the access device meets the safety isolation condition includes: The safety level of the access device is lower than the safety level of the to-be-accessed data.

Further, the safety level-related information of the to-be-accessed data includes an address of the to-be-accessed data. Whether the safety level of the access device is lower than the safety level of the to-be-accessed data may be determined based on the address of the to-be-accessed data.

For example, the safety level of the to-be-accessed data may be determined based on a first mapping relationship, and then whether the safety level of the access device is lower than the safety level of the to-be-accessed data is determined. The first mapping relationship indicates a correspondence between an address of data and a safety level of the data.

The first mapping relationship may be stored in the safety isolation apparatus, or may be stored in a register in the computer system.

Optionally, whether the safety level of the access device is lower than the safety level of the to-be-accessed data may be determined by performing the following steps.

(1) A first address is determined based on the first mapping relationship. The first address includes one or more addresses corresponding to data at a first safety level. The first safety level includes one or more safety levels higher than the safety level of the access device.

For example, a safety level of an access device is ASIL C, and the first safety level includes ASIL D. For another example, a safety level of an access device is ASIL B, and the first safety level includes ASIL C and ASIL D.

(2) If the address of the to-be-accessed data matches an address in the first address, it is determined that the safety level of the access device is lower than the safety level of the to-be-accessed data. The address of the to-be-accessed data matching the address in the first address may also be referred to as that the address of the to-be-accessed data hits the address in the first address.

Optionally, the method 100 may further include step 113.

113. The safety isolation apparatus determines whether the safety level of the access device meets a preset condition.

For example, the preset condition may be that the safety level is lower than a preset safety level. For example, a preset safety level may include ASIL D. If the operation of the access device is the write operation, and the safety level of the access device is lower than ASIL D, the request detection module may output an enable signal to the comparison module. For another example, a preset safety level may include ASIL D. If the operation of the access device is the RFO operation, and the safety level of the access device is lower than ASIL D, the request detection module may output an enable signal to the comparison module.

Optionally, the method 100 may further include step 114.

114. The safety isolation apparatus determines whether the access request is valid.

If the access request is invalid, the access request is isolated.

Optionally, the method 100 may further include step 115.

115. The safety isolation apparatus determines whether check information is the same as content of the access request. The check information is obtained by copying the content of the access request. For example, the check information is obtained by copying the operation information of the access device, the safety level-related information of the to-be-accessed data, and the safety level-related information of the access device that are carried in the access request. If the check information is different from the content of the access request, the access request is isolated.

120. The safety isolation apparatus isolates the access request if the operation of the access device is the write operation or the RFO operation, and the safety level of the access device meets the safety isolation condition.

Specifically, the safety isolation apparatus may be configured to route the access request. For example, the safety isolation apparatus may include a multiplexer (MUX).

Isolating the access request may be understood that the access device is not allowed to access to-be-accessed data. For example, the safety isolation apparatus may not route the access request to the to-be-accessed data. The computer system may further include a default slave device. For example, the default slave device may be a fault processing device. The safety isolation apparatus may route the access request to the default slave device.

Optionally, step 120 further includes: The safety isolation apparatus allows the access request if the operation of the access device is a non-write operation and a non-RFO operation, or the safety level of the access device does not meet the safety isolation condition.

Allowing the access request means that the access device is allowed to access the to-be-accessed data. For example, the safety isolation apparatus may route the access request to the to-be-accessed data.

That is, if the operation of the access device is the non-write operation and the non-RFO operation, for example, if the operation of the access device is a non-RFO read operation, the safety isolation apparatus may route the access request to the to-be-accessed data.

Alternatively, if the safety level of the access device does not meet the safety isolation condition, for example, if the safety level of the access device is higher than or equal to the safety level of the to-be-accessed data, the safety isolation apparatus may route the access request to the to-be-accessed data.

In this way, an access request that does not meet the safety isolation condition may be permitted, and an access request for the non-RFO read operation may be permitted. For example, the access device is allowed to perform the write operation or the RFO operation on data at a same safety level or a low safety level, and the access device is allowed to perform the non-RFO read operation on the to-be-accessed data.

Further, the computer system may further include a function safety module, for example, a function safety CPU. The safety isolation apparatus may further report a safety interruption to the function safety module, to notify software that a safety fault has occurred. This can ensure that the system does not stop responding, and the safety fault is visible to the software. Therefore, function safety integrity is ensured.

When the method 100 includes step 113, step 120 may be: isolating the access request if the safety level of the access device meets the preset condition, the operation of the access device is the write operation or the RFO operation, and the safety level of the access device meets the safety isolation condition.

Step 111, step 112, and step 113 may be performed at the same time, or may be performed in a particular order.

For example, step 113 and step 111 are performed, and if the safety level of the access device meets the preset condition, and the operation of the access device is the write operation or the RFO operation, step 112 is performed. For another example, step 113 is performed, and if the safety level of the access device meets the preset condition, step 111 is performed. If the operation of the access device is the write operation or the RFO operation, step 112 is performed.

When the method 100 includes step 114, if the access request is valid, step 120 may be performed.

It should be understood that step 111, step 112, step 113, and step 114 may be performed at the same time, or may be performed in a particular order.

When the method 100 includes step 115, if the check information is the same as the content of the access request, step 120 may be performed.

When the method 100 includes step 114 and step 115, if the access request is valid, and the check information is the same as the content of the access request, step 120 may be performed. If an access device at a low safety level rewrites to-be-accessed data at a high safety level, when an access device at a high safety level uses the rewritten to-be-accessed data, a function safety requirement of the access device at the high safety level cannot be met, and consequently a system fault is caused. In this embodiment of this application, devices and data in the computer system are classified based on the safety levels, so that the devices and data at different safety levels can be isolated. The access request is analyzed to prevent the access device that meets the isolation condition from rewriting the to-be-accessed data, so that efficient data interaction between the devices at different safety levels in the computer system is implemented while the function safety requirement of the computer system is met, to improve system performance. For example, an access device at a low safety level is prevented from rewriting to-be-accessed data at a high safety level, and a device at a low safety level is prevented from affecting a device at a high safety level.

According to this solution in this embodiment of this application, the device at the low safety level can be prevented from rewriting data at the high safety level, and system function safety is ensured. In addition, the non-RFO read operation at any safety level is allowed, and the access device is allowed to perform the write operation and the RFO operation on the data at the same safety level or the low safety level, so that efficient data interaction in the system can be implemented, to improve system performance.

Figure 5:
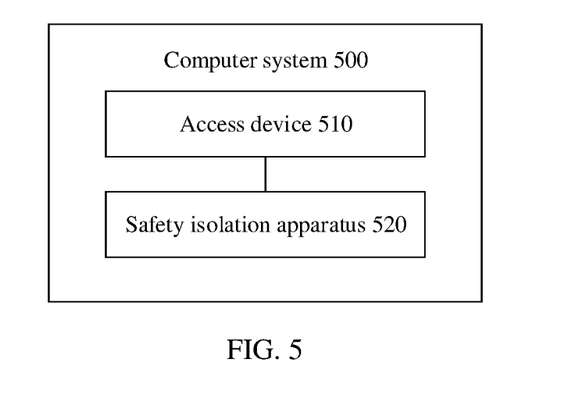
FIG. 5 is a schematic block diagram of a computer system according to an embodiment of this application.

FIG. 5 is a schematic block diagram of a computer system according to an embodiment of this application. The computer system includes a plurality of devices at different safety levels, for example, an access device 510 and a safety isolation apparatus 520 shown in FIG. 5. It should be understood that the computer system and the safety isolation apparatus described below can perform corresponding steps of a communications method in this embodiment of this application, and repeated descriptions are properly omitted when the computer system and the safety isolation apparatus in this embodiment of this application are described below.

The access device 510 is configured to send an access request. The access request carries operation information of the access device and safety level-related information of the access device. The safety level-related information of the access device indicates a safety level of the access device. The operation information indicates an operation of the access device.

The safety isolation apparatus 520 is configured to: receive the access request, and if the operation of the access device is a write operation or an RFO operation, and the safety level of the access device meets a safety isolation condition, isolate the access request. Isolating the access request means that the access device is not allowed to access to-be-accessed data.

Optionally, the safety isolation apparatus 520 is further configured to: if the operation of the access device is a non-write operation and a non-RFO operation, or the safety level of the access device does not meet the safety isolation condition, allow the access request. Allowing the access request means that the access device is allowed to access the to-be-accessed data.

Optionally, the access request further includes safety level-related information of the to-be-accessed data. The safety level-related information of the to-be-accessed data indicates a safety level of the to-be-accessed data. That the safety level of the access device meets the safety isolation condition includes: The safety level of the access device is lower than the safety level of the to-be-accessed data.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that this implementation goes beyond the scope of this application.

It may be clearly understood by a person skilled in the art that, for ease and brevity of description, for a detailed working process of the foregoing systems, apparatuses, and units, refer to a corresponding process in the foregoing method embodiments. Details are not described herein again.

In the several embodiments provided in this application, it should be understood that the disclosed systems, apparatuses, and methods may be implemented in another manner. For example, the foregoing described apparatus embodiments are merely examples. For example, division of the units is merely a logical function division and may be another division during actual implementation. For example, a plurality of units or components may be combined or integrated into another system, or some features may be ignored or may not be performed. In addition, the displayed or discussed mutual coupling or direct coupling or communications connection may be implemented through direct coupling or communications connection between some interfaces, apparatuses or units, or may be implemented in electrical, mechanical, or other forms.

The units described as separate parts may or may not be physically separated, and parts displayed as units may or may not be physical units, that is, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, technical solutions of this application essentially, or the part contributing to the current technology, or some of the technical solutions may be implemented in a form of a software product. The computer software product is stored in a storage medium, and includes a plurality of instructions for instructing a computer device (which may be a personal computer, a server, or an access network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A safety isolation apparatus configured to be connected, in between an access device and an accessed device comprising to-be-accessed data, to a communication bus of a computer system, and comprising a request detection module, a selection module, and a comparison module, wherein
the request detection module is configured to receive, via the communication bus, an access request from the access device in the computer system, wherein the access request carries operation information of the access device to access the to-be-accessed data and safety level-related information of the access device, the safety level-related information of the access device indicates a safety level of the access device, and the operation information indicates an operation of the access device, wherein the safety level of the access device is one of three or more safety levels assigned to devices connected to the communication bus, and wherein the access request further comprises safety level-related information of the to-be-accessed data, and the safety level-related information of the to-be-accessed data indicates the safety level of the to-be-accessed data,
wherein the request detection module is further configured to parse information carried in the access request to determine whether information other than the safety level-related information of the access device meets the preset safety isolation requirement, and based on the determining whether information other than the safety level-related information of the access device meets the preset safety isolation requirement transmit, output an enable signal;
the comparison module is configured to, based on a value of the enable signal, determine whether the safety level of the access device meets a preset safety isolation condition, and wherein the safety level of the access device meets a preset safety isolation condition comprises the safety level of the access device is lower than the safety level of the to-be-accessed data; and
the selection module is configured to, if the operation of the access device is a write operation or a read for ownership (RFO) operation, and the safety level of the access device meets a preset safety isolation condition, isolate the access request, wherein the selection module is further configured to: if the operation of the access device is a non-write operation and a non-RFO operation, or the safety level of the access device does not meet the preset safety isolation condition, allow the access request.

2. The apparatus according to claim 1, wherein the safety level-related information of the to-be-accessed data comprises an address of the to-be-accessed data, and the comparison module is further configured to:
determine, based on the address of the to-be-accessed data, that the safety level of the access device is lower than the safety level of the to-be-accessed data.

3. The apparatus according to claim 2, wherein the comparison module is further configured to:
- determine a first address based on a first mapping relationship, wherein the first address comprises one or more addresses corresponding to data at a first safety level, the first safety level comprises one or more safety levels higher than the safety level of the access device, and the first mapping relationship indicates a correspondence between a safety level of data and an address of the data; and
- if the address of the to-be-accessed data matches an address in the first address, determine that the safety level of the access device is lower than the safety level of the to-be-accessed data.

4. The apparatus according to claim 3, wherein the comparison module is further configured to:
- obtain the first mapping relationship from a register group.

5. The apparatus according to claim 1, wherein the selection module is further configured to:
- if the operation of the access device is the write operation or the RFO operation, and the safety level of the access device meets the preset safety isolation condition, report a safety interruption.

6. A computer system, comprising a safety isolation apparatus and an access device, wherein
- the access device is configured to: send an access request, wherein the access request carries operation information of the access device and safety level-related information of the access device, the safety level-related information of the access device indicates a safety level of the access device, and the operation information indicates an operation of the access device wherein the safety level of the access device is one of three or more safety levels assigned to devices connected to the communication bus, and wherein the access request further comprises safety level-related information of a to-be-accessed data, and the safety level-related information of the to-be-accessed data indicates the safety level of the to-be-accessed data; and
- the safety isolation apparatus is configured to: receive the access request, parse information carried in the access request to determine whether information other than the safety level-related information of the access device meets the preset safety isolation requirement, based on the determining whether information other than the safety level-related information of the access device meets the preset safety isolation requirement, output an enable signal, and, based on a value of the enable signal, if the operation of the access device is a write operation or a read for ownership (RFO) operation and the safety level of the access device meets a preset safety isolation condition, isolate the access request, and if the operation of the access device is a non-write operation and a non-RFO operation, or the safety level of the access device does not meet the preset safety isolation condition, allow the access request, wherein the safety level of the access device meets a preset safety isolation condition comprises the safety level of the access device is lower than the safety level of the to-be-accessed data.

7. A safety isolation method, comprising:
- receiving an access request from an access device, wherein the access request includes operation information of the access device and safety level-related information of the access device to access to-be-accessed data in an accessed device, the safety level-related information of the access device indicates a safety level of the access device, and the operation information indicates an operation of the access device, wherein the safety level of the access device is one of three or more safety levels assigned to devices connected to the communication bus, and wherein the access request further comprises safety level-related information of the to-be-accessed data, and the safety level-related information of the to-be-accessed data indicates the safety level of the to-be-accessed data;
- parse information carried in the access request to determine whether information other than the safety level-related information of the access device meets the preset safety isolation requirement, and based on the determining whether information other than the safety level-related information of the access device meets the preset safety isolation requirement, output an enable signal; and
- based on a value of the enable signal, if the operation of the access device is a write operation or a read for ownership (RFO) operation and the safety level of the access device meets a preset safety isolation condition, isolating the access request, and if the operation of the access device is a non-write operation and a non-RFO operation, or the safety level of the access device does not meet the preset safety isolation condition, allowing the access request, wherein the safety level of the access device meet the preset safety isolation condition comprises the safety level of the access device is lower than the safety level of the to-be-accessed data.

8. The method according to claim 7, wherein the safety level-related information of the to-be-accessed data comprises an address of the to-be-accessed data, and
- the safety level of the access device is lower than the safety level of the to-be-accessed data; and the method further comprises:
- determining, based on the address of the to-be-accessed data, that the safety level of the access device is lower than the safety level of the to-be-accessed data.

9. The method according to claim 8, wherein the determining, based on the address of the to-be-accessed data, that the safety level of the access device is lower than the safety level of the to-be-accessed data comprises:
- determining a first address based on a first mapping relationship, wherein the first address comprises one or more addresses corresponding to data at a first safety level, the first safety level comprises one or more safety levels higher than the safety level of the access device, and the first mapping relationship indicates a correspondence between a safety level of data and an address of the data; and
- if the address of the to-be-accessed data matches an address in the first address, determining that the safety level of the access device is lower than the safety level of the to-be-accessed data.

10. The method according to claim 9, wherein the method further comprises:
- obtaining the first mapping relationship from a register group.

11. The method according to claim 7, wherein the method further comprises:
- if the operation of the access device is the write operation or the RFO operation, and the safety level of the access device meets the preset safety isolation condition, reporting a safety interruption.

* * * * *